(12) United States Patent
Buttolo et al.

(10) Patent No.: US 12,675,105 B2
(45) Date of Patent: Jul. 7, 2026

(54) SYSTEMS AND METHODS FOR ENABLING VEHICLE MOVEMENT VIA AN EXTERNAL INTERFACE

(71) Applicant: Ford Global Technologies, LLC, Dearborn, MI (US)

(72) Inventors: Pietro Buttolo, Dearborn Heights, MI (US); Scott Steadmon Thompson, Belleville, MI (US); David Hancock, South Rockwood, MI (US); John Eric Rollinger, Troy, MI (US); Joseph Dorigo, Plymouth, MI (US); Matthew Ryan Preston, Whitmore Lake, MI (US)

( * ) Notice: Subject to any disclaimer, the term of this patent is extended or adjusted under 35 U.S.C. 154(b) by 155 days.

(21) Appl. No.: 18/500,010

(22) Filed: Nov. 1, 2023

(65) Prior Publication Data

US 2025/0138528 A1 May 1, 2025

(51) Int. Cl.
*G05D 1/00* (2024.01)
*B60R 25/24* (2013.01)

(52) U.S. Cl.
CPC .......... *G05D 1/0016* (2013.01); *B60R 25/24* (2013.01); *G05D 1/0022* (2013.01); *G05D 1/0223* (2013.01); *B60R 2325/103* (2013.01)

(58) Field of Classification Search
CPC .. G05D 1/0016; G05D 1/0022; G05D 1/0223; B60R 25/24; B60R 2325/103
USPC .......... 701/2, 23, 36, 1, 25, 26, 24, 50, 117, 701/301, 41, 22, 70, 408, 93, 300, 45, 701/33.4, 115, 48, 11, 400, 32.5, 33.2, 701/487, 491, 526, 409, 84, 110, 418
See application file for complete search history.

(56) References Cited

U.S. PATENT DOCUMENTS

| | | | |
|---|---|---|---|
| 9,922,559 B1 | 3/2018 | Inoue | |
| 10,600,125 B1 | 3/2020 | Christensen | |
| 10,773,642 B2 | 9/2020 | Cunningham, III et al. | |
| 2012/0169612 A1 | 7/2012 | Alameh et al. | |
| 2015/0303993 A1* | 10/2015 | Showering ............ | H04W 12/06 455/41.1 |

(Continued)

OTHER PUBLICATIONS

Mebesafe, a Nudge in the Car To Increase Attention, www.mebesafe. eu, Mar. 2023, pp. 1-3.

(Continued)

*Primary Examiner* — Anne Marie Antonucci
*Assistant Examiner* — Jodi Jones
(74) *Attorney, Agent, or Firm* — Frank Lollo; Eversheds Sutherland (US) LLP

(57) ABSTRACT

A vehicle including a transceiver, a vehicle sensor unit and a processor is disclosed. The transceiver may be configured to receive interface information from an interface sensor unit associated with an external interface. The external interface may be configured to be removably attached to a plurality of connection ports disposed on the vehicle. The vehicle sensor unit may be configured to determine vehicle information associated with at least one of a vehicle movement and the plurality of connection ports. The processor may obtain the interface information and/or the vehicle information. The processor may further determine an interface location relative to the vehicle based on the interface information and/or the vehicle information. Further, the processor may control a vehicle speed and/or a vehicle steering wheel rotation based on the interface location.

18 Claims, 6 Drawing Sheets

(56)         References Cited

U.S. PATENT DOCUMENTS

| 2015/0375741 | A1* | 12/2015 | Kiriya | G06V 40/28 |
| | | | | 701/2 |
| 2019/0064822 | A1* | 2/2019 | Görg | G05D 1/028 |
| 2019/0354123 | A1* | 11/2019 | Cund | B60W 30/143 |
| 2021/0026347 | A1* | 1/2021 | Nakashima | G05D 1/0016 |
| 2021/0089021 | A1* | 3/2021 | Shimamoto | B62D 1/00 |
| 2021/0302189 | A1* | 9/2021 | Buddharaju | H04W 4/027 |
| 2021/0327169 | A1* | 10/2021 | Garcia | G05D 1/0044 |
| 2022/0004183 | A1* | 1/2022 | Raeis Hosseiny | B62D 1/00 |
| 2022/0024413 | A1* | 1/2022 | Li | B60R 25/31 |
| 2022/0365527 | A1* | 11/2022 | Suzuki | B60W 30/06 |
| 2024/0012408 | A1* | 1/2024 | Whitney | B60R 25/24 |
| 2024/0101067 | A1* | 3/2024 | Takeuchi | B60R 25/23 |

OTHER PUBLICATIONS

Randi Karlsen, et al., Recommendations With a Nudge, www.mdpi.com/journal/technologies, Jun. 13, 2019, pp. 1-16.

* cited by examiner

SYSTEMS AND METHODS FOR ENABLING VEHICLE MOVEMENT VIA AN EXTERNAL INTERFACE

FIELD

The present disclosure relates to systems and methods for enabling vehicle movement via an external interface configured to be removably attached to a vehicle exterior surface.

BACKGROUND

Users may move their vehicles over relatively short distances frequently when the users may be performing outdoor activities or tasks. For example, a user may frequently move the user's vehicle over short distances (e.g., 5-10 meters) as the user performs the activity.

It may be inconvenient for the user to frequently enter and move the vehicle and then exit the vehicle multiple times to perform the activity, and hence the user may not prefer to enter the vehicle frequently when the user may be performing such activities. Therefore, it may be desirable to have a system that may enable the user to conveniently move the vehicle over relatively short distances without repeatedly entering and exiting the vehicle.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
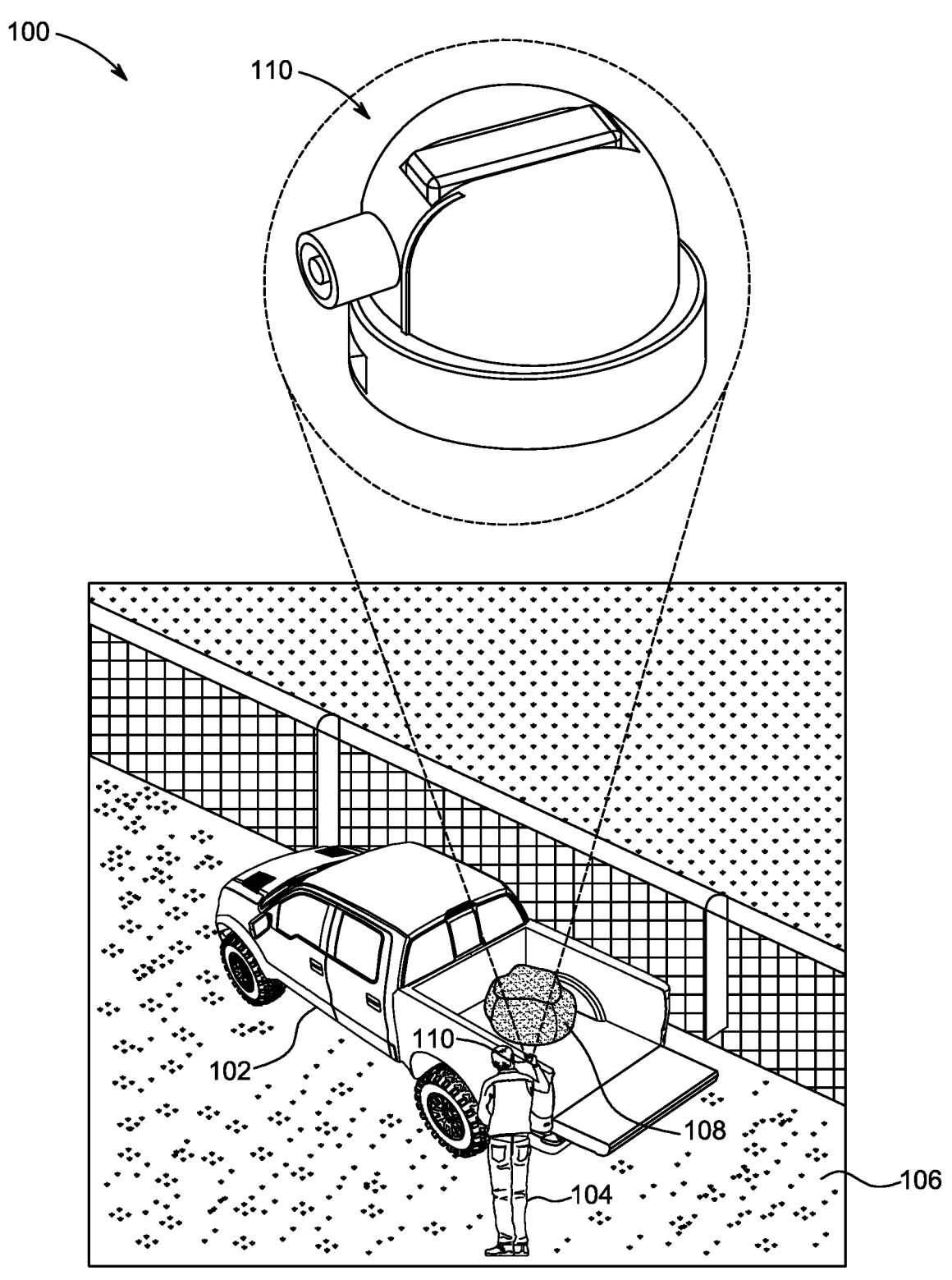
FIG. 1 depicts an environment in which techniques and structures for providing the systems and methods disclosed herein may be implemented.

The present disclosure describes a vehicle that may be moved by using an external interface that may be removably attached to a vehicle exterior surface. A user may cause vehicle movement and/or vehicle steering wheel rotation by providing user inputs to the interface, which may transmit the user inputs via a wired connection or a wireless network to the vehicle to cause the vehicle movement and/or the vehicle steering wheel rotation. In some aspects, the vehicle may be configured to control the vehicle speed and/or the vehicle steering wheel rotation based on an interface location and/or orientation relative to the vehicle and a maximum permissible vehicle speed/steering wheel rotation angle associated with the interface location and/or orientation. For example, the vehicle may not enable the vehicle speed to increase beyond a first predefined maximum speed when the interface location may be in the vehicle (e.g., connected to a vehicle connection port disposed on the vehicle exterior surface) and may not enable the vehicle speed to increase beyond a second predefined maximum speed when the interface location may be outside the vehicle (e.g., when the user may be holding the interface in user's hand). In an exemplary aspect, the first predefined maximum speed may be different from the second predefined maximum speed.

In some aspects, the vehicle may determine the interface location and/or orientation relative to the vehicle based on interface information that the vehicle may obtain from an interface sensor unit associated with the interface, vehicle information that the vehicle may obtain from a vehicle sensor unit, and user device information that the vehicle may obtain from a user device that the user may be carrying. In an exemplary aspect, the interface sensor unit may include an interface accelerometer, an interface gyroscope and an interface magnetometer, and the interface information may include information associated with interface movement speed and direction, inclination/tilt relative to ground, interface angular motion, and/or the like. The vehicle sensor unit may include a vehicle accelerometer, a vehicle gyroscope, a vehicle magnetometer, and vehicle interior and exterior cameras, and the vehicle information may include information associated with vehicle movement speed and direction, inclination/tilt relative to ground, vehicle angular motion, and/or the like. Similarly, the user device information may include user device movement speed and direction, inclination/tilt relative to ground, user device angular motion, and/or the like.

The vehicle may correlate the interface information, the vehicle information and/or the user device information described above to determine the interface location and/or orientation relative to the vehicle. For example, the vehicle may correlate the information described above to determine whether the interface may be located in the vehicle or may be held in the user's hand when the user may be located outside the vehicle.

In further aspects, the vehicle information may include a connection status associated with each connection port, of a plurality of connection ports disposed on the vehicle exterior surface, with the interface. The vehicle may determine whether the interface may be attached to a connection port and the corresponding interface orientation relative to the vehicle based on the connection status included in the vehicle information.

Responsive to determining the interface location and/or orientation relative to the vehicle, the vehicle may obtain a mapping associated with the determined interface location and/or orientation with maximum permissible vehicle speed, steering wheel rotation angle and/or travel distance from a vehicle memory or an external server, to control the vehicle movement. In some aspects, the vehicle may additionally control and/or activate vehicle advanced driver-assistance system (ADAS) features and/or vehicle proximity sensors based on the determined interface location relative to the vehicle.

The present disclosure discloses a vehicle that may be moved by providing inputs to an interface that may be removably attached to a vehicle exterior surface. The interface may enable the user to cause the vehicle movement without having to enter the vehicle interior portion. Since the user is not required to enter the vehicle to cause the vehicle movement, the interface may facilitate the user in performing outdoor activities such as farming, laying fences, etc., which may require frequent vehicle movement over short distances. Further, the interface is easy to attach to the vehicle exterior surface via the plurality of connection ports, thus enhancing ease of use for the user.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an example environment 100 in which techniques and structures for providing the systems and methods disclosed herein may be implemented. The environment 100 may include a vehicle 102 and a user 104. The user 104 may be performing an outdoor activity in a farm 106 where the vehicle 102 may be located. For example, the user 104 may be sowing plants on a farm periphery or may be laying fences. The user 104 may be using vehicle cargo bed to store material 108 that may be required to perform the outdoor activity, e.g., sand, plants, equipment/tools, manure, and/or the like. In some aspects, the user 104 may be required to move the vehicle 102 frequently over short distances (e.g., 5-10 meters) as the user 104 performs the outdoor activity around the farm periphery.

The vehicle 102 may take the form of any passenger or commercial vehicle such as, for example, a car, a work vehicle, a crossover vehicle, a van, a minivan, etc. Further, the vehicle 102 may be a manually driven vehicle and/or may be configured to operate in a fully autonomous (e.g., driverless) mode or a partially autonomous mode and may include any powertrain such as, for example, a gasoline engine, one or more electrically-actuated motor(s), a hybrid system, etc.

The environment 100 may further include an external interface 110 (or interface 110) that may be configured to be removably attached to a vehicle exterior surface (or a vehicle interior surface). In some aspects, the vehicle exterior surface may include one or more cavities or slots or connection ports (shown as connection ports 250 in FIG. 2) into which the user 104 may insert/attach or "plug-in" the interface 110. As an example, the connection ports may be disposed on a top surface of vehicle side walls, on right and left edges of a vehicle bumper, a vehicle cargo bed, and/or the like. The user 104 may removably attach the interface 110 to a connection port via an elongated connector (shown as connector 302 in FIG. 3) that may be inserted into the connection port. In the exemplary aspect depicted in FIG. 1, the interface 110 is attached to the top surface of a vehicle side wall, although the present disclosure is not limited to such an aspect.

The interface 110 may be configured to cause and/or control vehicle movement based on user inputs. In some aspects, the user 104 may not be required enter and exit the vehicle 102 multiple times to frequently move the vehicle 102 over the short distances around the farm periphery by using the interface 110. Since the interface 110 may be configured to be removably attached to the vehicle exterior surface, the user 104 may conveniently cause and control the vehicle movement from outside the vehicle 102 by using the interface 110.

In some aspects, the interface 110 may be configured to cause and/or control the vehicle movement when the interface 110 may be attached to one of the connection ports described above. In other aspects, the interface 110 may be configured to cause and/or control the vehicle movement by transmitting command signals wirelessly to the vehicle 102 when the interface 110 may be disposed within a predefined distance from the vehicle 102. As an example, the user 104 may hold the interface 110 in user's hand/palm and provide the user inputs to the interface 110. The interface 110 may then generate command signals associated with the user inputs and wirelessly transmit the command signals to the vehicle 102 to cause the vehicle movement. In some aspects, a maximum permissible vehicle speed and/or a maximum permissible vehicle steering wheel rotation angle may be different based on whether the interface 110 is attached to a connection port, or the interface 110 is held in user's palm (and not attached to any connection port). Further, the maximum permissible vehicle speed and/or a maximum permissible vehicle steering wheel rotation angle may be different based on whether the user 104 is in the vehicle 102 (e.g., holding the interface 110 in user's hand) or the user 104 is walking in proximity to the vehicle 102 holding the interface 110 in user's hand (and outside the vehicle 102). The vehicle 102 may be configured to determine an interface location and/or orientation relative to the vehicle 102 and may accordingly enable the interface 110 to cause and/or control the vehicle movement based on the interface location and/or orientation and the user inputs.

In some aspects, the interface 110 may be dome-shaped (as shown in FIG. 1) and may include a user input detection unit (not shown) including, but not limited to, pressure sensors, a spring-loaded rotary position sensing element, and/or the like, which may detect user inputs associated with desired vehicle movement when the user 104 interacts with the interface 110. As an example, the user 104 may provide a "forward push" to the interface 110 when the user 104 desires the vehicle 102 to move forward. The forward push may be detected by the pressure sensors included in the user input detection unit, and the pressure sensors may then generate electric current/command signals that may be transmitted, e.g., via a wired connection or a wireless network, to the vehicle 102 to cause vehicle forward movement. Similarly, the user 104 may provide a "backward push" to the interface 110 when the user 104 desires the vehicle 102 to move in a reverse direction. Furthermore, the user 104 may rotate the interface 110 in a clockwise or counterclockwise direction when the user 104 desires a vehicle steering wheel to rotate right or left. In this case, the spring-loaded rotary position sensing element may generate the command signals that may enable the vehicle 102 to cause the vehicle steering wheel to rotate right or left.

In other aspects, the interface 110 may have a shape of an elongated rod or stick and may act like a joystick having one or more tilt sensors, torsional motion sensors, and/or the like. In yet another aspect, the interface 110 may include a plurality of switches or buttons on a switchboard, which may be removably attached to the vehicle 102 or may be handheld. Although FIG. 1 depicts the interface 110 to be dome-shaped and the description below is described in the context of a dome-shaped interface, such depiction and description should not be construed as limiting, and the interface 110 may have any other shape as described above.

In some aspects, to cause and/or control the vehicle movement using the interface 110, the user 104 may first activate an external interface movement mode associated with the vehicle 102. For example, the user 104 may transmit a request to the vehicle 102 to activate the external interface movement mode when the user 104 desires to cause and/or control the vehicle movement using the interface 110. The user 104 may transmit the request via a user device (shown as user device 202 in FIG. 2) or a vehicle Human-Machine Interface (HMI) or vehicle infotainment system (shown as infotainment system 246 in FIG. 2). Responsive to receiving the request, the vehicle 102 may authenticate the user 104, determine whether the user 104 is in proximity to the vehicle 102 and authenticate the interface 110 (e.g., to determine that the interface 110 is an authentic interface associated with the vehicle 102), before enabling the user 104 to cause and/or control the vehicle movement using the interface 110.

In some aspects, the vehicle 102 may authenticate the user 104 by requesting the user 104 to input a preset passcode/ password on the infotainment system or the user device, by authenticating the user device (e.g., when the user device may be executing a phone-as-a-key (PaaK) application and communicatively paired with the vehicle 102), and/or by authenticating/pairing with a key fob (not shown) associated with the vehicle 102 that the user 104 may be carrying. The methods described here for authenticating the user 104 are exemplary in nature and should not be construed as limiting. The vehicle 102 may authenticate the user 104 by any other method (e.g., facial recognition, fingerprint recognition, etc.) as well, without departing from the present disclosure scope.

The vehicle 102 may determine that the user 104 may be in proximity to the vehicle 102 by determining user device location (when the user device may be executing the PaaK application and communicatively paired with the vehicle 102) or key fob location. When the user device may not be executing the PaaK application, the vehicle 102 may determine the user device location by determining received signal strength indicator (RSSI) value associated with the user device. In other aspects, the vehicle 102 may determine that the user 104 may be in proximity to the vehicle 102 by obtaining user images from vehicle cameras and/or inputs from other vehicle sensors (e.g., radio detecting and ranging (radar) sensors). The methods described here for determining that the user 104 may be in proximity to the vehicle 102 are exemplary in nature and should not be construed as limiting. The vehicle 102 may determine user location by any other method as well, without departing from the present disclosure scope.

The vehicle 102 may authenticate the interface 110 by exchanging preset authentication codes with the interface 110, when the interface 110 may be communicatively coupled with the vehicle 102 via a wireless network and/or when the interface 110 may be attached to a connection port described above. The preset authentication codes may be pre-stored in the vehicle 102 and the interface 110 when, for example, the interface 110 may be first registered with the vehicle 102 (e.g., when the interface 110 may be first used with the vehicle 102). In other aspects, in addition to or alternative to exchanging the preset authentication codes, the vehicle 102 and the interface 110 may obtain an encryption key from an external server (shown as server 204 in FIG. 2) when the interface 110 may be communicatively coupled with the vehicle 102 and/or when the interface 110 may be attached to a connection port. In this case, the vehicle 102 may authenticate the interface 110 by obtaining the encryption key from the interface 110 and matching it with the encryption key that the vehicle 102 may have obtained from the external server. In some aspects, a new encryption key may be generated and transmitted by the external server to the vehicle 102 and the interface 110 each time the interface 110 may be coupled/attached with the vehicle 102.

When the vehicle 102 authenticates the user 104 and the interface 110 and determines that the user 104 may be located within a predefined distance from the vehicle 102, the vehicle 102 may enable the interface 110 to cause and/or control the vehicle movement based on the user inputs received at the interface 110. Stated another way, in this case, the vehicle 102 may activate the external interface movement mode associated with the vehicle 102.

In some aspects, responsive to enabling the interface 110 to cause and/or control the vehicle movement, the vehicle 102 may determine whether the interface 110 may be attached to a connection port in the vehicle 102 or the user 104 may be holding the interface 110, e.g., on a user palm/hand. The vehicle 102 may further determine an interface location and/or orientation relative to the vehicle 102. In some aspects, the vehicle 102 may make such determinations to identify a maximum permissible vehicle speed and/or a maximum permissible vehicle steering wheel rotation angle that may be allowed based on the user inputs on the interface 110. For example, when the user 104 may be holding the interface 110 in the user palm, the vehicle 102 may allow a lower maximum vehicle speed as compared to when the interface 110 may be attached to a connection port (and the user 104 may be outside the vehicle 102). In additional aspects, the vehicle 102 may make such determinations to control and/or activate vehicle advanced driver-assistance system (ADAS) features and/or vehicle proximity sensors based on the determined interface location relative to the vehicle 102. Further, based on the determined interface location relative to the vehicle 102, the vehicle 102 may use one or more vehicle speakers, vehicle lights or vehicle display screens closest to the determined interface location to provide/output notifications associated with an interface operational status, a vehicle movement status, and/or the like, to the user 104. The vehicle 102 may further use remaining vehicle speakers, vehicle lights or vehicle display screens to provide similar or different notifications to bystanders who may be located in proximity to the vehicle 102.

In some aspects, the vehicle 102 may determine whether the interface 110 may be attached or detached from a connection port and the interface location and/or orientation based on interface information that the vehicle 102 may obtain from an interface sensor unit, vehicle information that the vehicle 102 may obtain from a vehicle sensor unit, and/or user device information that the vehicle 102 may obtain from the user device associated with the user 104. In an exemplary aspect, the interface sensor unit may include an interface accelerometer, an interface gyroscope, and/or an interface magnetometer, and the interface information may include information associated with interface movement speed and direction, inclination/tilt relative to ground or north/south pole, interface angular motion, and/or the like. In some aspects, by using the interface information obtained from the interface accelerometer, the interface gyroscope, and/or the interface magnetometer, the vehicle 102 may not only determine the interface location relative to the vehicle 102, but may also determine a mounting point or the connection port on the vehicle 102 at which the interface 110 may be attached. This is because an interface rate of change of speed pattern is a function of a mounting location/point on the vehicle 102, and the vehicle 102 may compare an axial rate of change of speed pattern associated with the interface 110 obtained from the interface sensor unit with a vehicle axial rate of change of speed pattern obtained from the vehicle sensor unit to determine the interface mounting location/point on the vehicle 102.

The vehicle sensor unit may include a plurality of vehicle sensors including, but not limited to, a vehicle accelerometer, a vehicle gyroscope, a vehicle magnetometer, vehicle interior and exterior cameras, and/or the like. In some aspects, the vehicle information may include vehicle movement information associated with vehicle movement speed and direction, vehicle inclination/tilt relative to ground, vehicle angular motion, and/or the like. In additional aspects, the vehicle sensor unit may be configured to obtain signals from the plurality of connection ports that may be located in the vehicle 102. In this case, the vehicle information may include information associated with connection status of each connection port. For example, the vehicle information may include information indicating that the interface 110 may be attached to or inserted into a first connection port, from the plurality of connection ports.

The user device information may include information associated with user device movement speed, inclination/tilt relative to ground or north/south pole, user device angular motion, and/or the like, which the user device may determine based on signals obtained from user device accelerometer, gyroscope and magnetometer.

Responsive to obtaining the interface information, the vehicle information and/or the user device information, the vehicle 102 may correlate the obtained information to determine whether the interface 110 may be attached to or detached from a connection port and the interface location and/or orientation relative to the vehicle 102 based on the correlation. The process of determining whether the interface 110 may be attached to or detached from a connection port and the interface location and/or orientation is described later in detail below in conjunction with FIG. 2.

Responsive to determining the interface location and/or orientation, the vehicle 102 may fetch/obtain a mapping of different interface locations and/or orientations with maximum permissible/allowable vehicle speeds and/or vehicle steering wheel rotation angles that may be pre-stored in a vehicle memory or the external server. The vehicle 102 may then enable the vehicle movement based on the mapping, the determined interface location and/or orientation, and the user inputs obtained from the interface 110. For example, when the interface 110 may be attached to a connection port disposed at a vehicle rear portion and the maximum allowable forward vehicle speed for such an interface location may be 5 miles per hour, the vehicle 102 may enable the vehicle 102 to move forward with a speed of not more than 5 miles per hour when the user 104 provides inputs to the interface 110 to cause the vehicle 102 to move forward. As another example, when the interface 110 may be disposed on the user palm (and not attached to a connection port) and the maximum allowable forward vehicle speed for such an interface location may be 3 miles per hour, the vehicle 102 may enable the vehicle 102 to move forward with a speed of not more than 3 miles per hour when the user 104 provides inputs to the interface 110 to cause the vehicle 102 to move forward. As described above, the vehicle 102 may further control and/or activate vehicle ADAS features and/or vehicle proximity sensors based on the determined interface location relative to the vehicle 102. For example, those vehicle proximity sensors may be activated that may be closer to the determined interface location. Furthermore, based on the determined interface location relative to the vehicle 102, the vehicle 102 may use one or more vehicle speakers, vehicle lights or vehicle display screens closest to the determined interface location to provide/output notifications associated with an interface operational status, a vehicle movement status, and/or the like, to the user 104. The vehicle 102 may further use remaining vehicle speakers, vehicle lights or vehicle display screens to provide/output similar or different notifications to bystanders who may be located in proximity to the vehicle 102.

Further details associated with the interface 110 and the vehicle 102 are described below in conjunction with the subsequent figures.

The vehicle 102 and the interface 110 implement and/or perform operations, as described here in the present disclosure, in accordance with the owner manual and safety guidelines. In addition, any action taken by the user 104 based on recommendations or notifications provided by the vehicle 102 should comply with all the rules specific to the location and operation of the vehicle 102 (e.g., Federal, state, country, city, etc.). The recommendation or notifications, as provided by the vehicle 102, should be treated as suggestions and only followed according to any rules specific to the location and operation of the vehicle 102.

Figure 2:
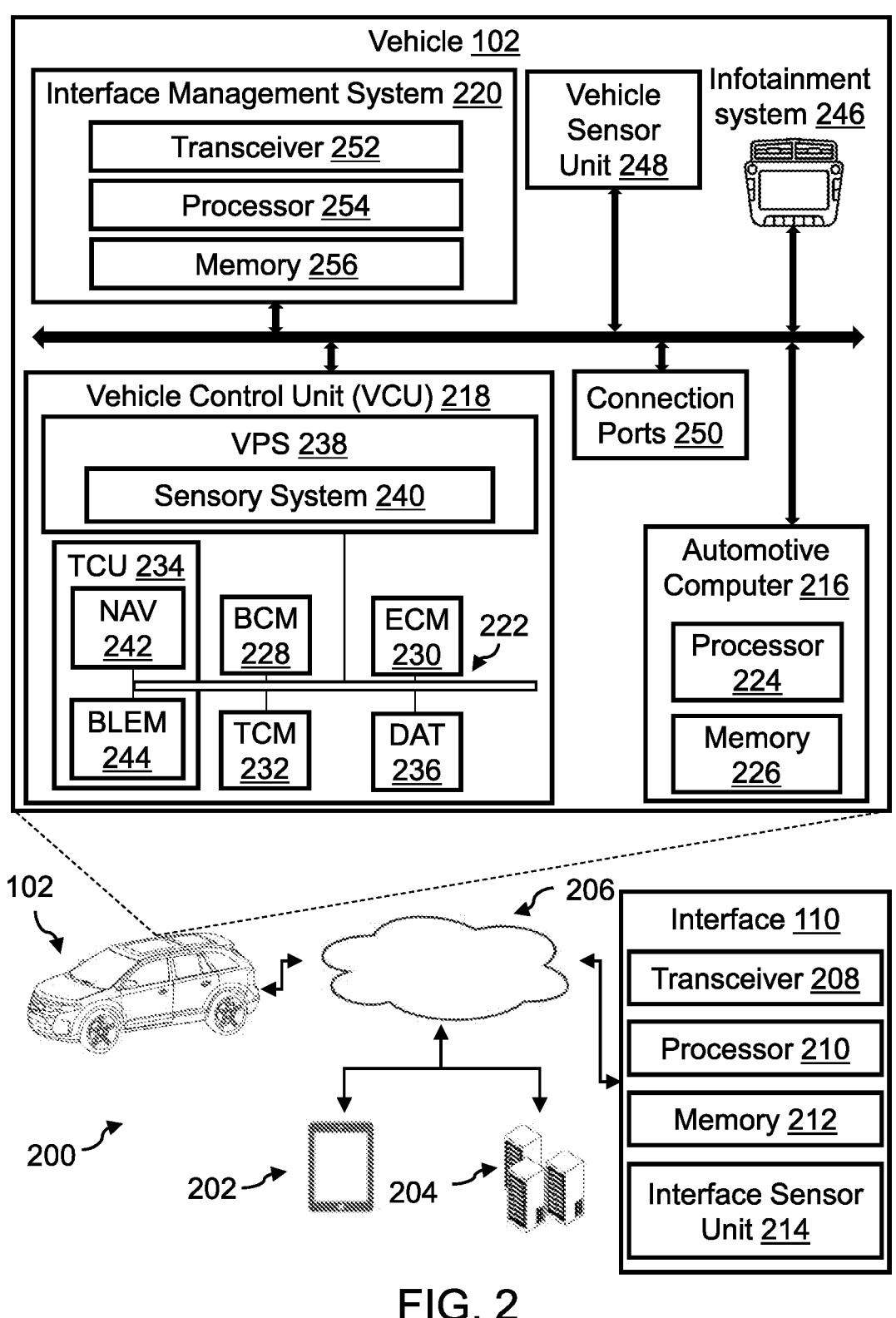
FIG. 2 depicts a block diagram of a system to enable a vehicle movement in accordance with the present disclosure.

FIG. 2 depicts a block diagram of a system 200 to enable a vehicle movement in accordance with the present disclosure. While describing FIG. 2, references will be made to FIGS. 3, 4 and 5.

The system 200 may include the vehicle 102, the interface 110, a user device 202, and one or more servers 204 (or server 204) communicatively coupled with each other via one or more networks 206 (or a network 206). In some aspects, the vehicle 102 and the interface 110 may be communicatively coupled with each other via the network 206 as shown in FIG. 2, or via a wired connection.

The user device 202 may be associated with the user 104 and may be, for example, a mobile phone, a laptop, a computer, a tablet, a wearable device, or any other similar device with communication capabilities. The server 204 may be part of a cloud-based computing infrastructure and may be associated with and/or include a Telematics Service Delivery Network (SDN) that provides digital data services to the vehicle 102 and other vehicles (not shown) that may be part of a vehicle fleet. In further aspects, the server 204 may be configured to provide encryption keys to the vehicle 102 and the interface 110 to enable interface authentication, when the user 104 transmits, e.g., via the user device 202, the request to the vehicle 102 to activate the external interface movement mode, as described above in conjunction with FIG. 1. In additional aspects, the server 204 may store and provide to the vehicle 102 a mapping of different interface locations and/or orientations relative to the vehicle 102 with maximum permissible/allowable vehicle speeds and/or vehicle steering wheel rotation angles and/or maximum permissible/allowable distances the vehicle 102 may travel. In some aspects, the server 204 may transmit the mapping to the vehicle 102 at a predefined frequency or when the vehicle 102 transmit a request to the server 204 to obtain the mapping. In other aspects, the mapping may be pre-stored in a vehicle memory. In an exemplary aspect, information associated with the mapping may be provided to the server 204 and/or the vehicle memory by the user 104 as part of user preferences. In alternative aspects, the information associated with the mapping may be provided to the server 204 and/or the vehicle memory by a vehicle manufacturer and/or an interface manufacturer.

The network 206 illustrates an example communication infrastructure in which the connected devices discussed in various embodiments of this disclosure may communicate. The network 206 may be and/or include the Internet, a private network, public network or other configuration that operates using any one or more known communication protocols such as, for example, transmission control protocol/Internet protocol (TCP/IP), Bluetooth®, BLE, Wi-Fi based on the Institute of Electrical and Electronics Engineers (IEEE) standard 802.11, ultra-wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

The interface 110 may include a plurality of units including, but not limited to, a transceiver 208, a processor 210, a memory 212 and an interface sensor unit 214. The transceiver 208 may be configured to transmit/receive, via a wired connection or the network 206, signals/information/data to/from one or more external systems or devices, e.g., the user device 202, the server 204, the vehicle 102, etc. The interface sensor unit 214 may include a plurality of sensors including, but not limited to, pressure sensors, capacitive sensors, rotary position sensing element, an interface accelerometer, an interface gyroscope, an interface magnetometer, and/or the like. The interface sensor unit 214 may be configured to determine/detect user inputs associated with vehicle longitudinal movement (e.g., vehicle forward or reverse movement) and/or vehicle steering wheel rotation on the interface 110 and generate electric current/command signals based on the user inputs. The interface sensor unit 214 may transmit the generated electric current/command signals to the transceiver 208, which in turn may transmit the command signals to the vehicle 102 to enable the vehicle movement based on the user inputs (e.g., when the vehicle 102 enables the interface 110 to cause and/or control the vehicle movement).

In further aspects, the interface sensor unit 214 may be configured to determine/detect interface information associated with the interface 110 based on the inputs received from the interface accelerometer, the interface gyroscope and/or the interface magnetometer. In some aspects, the interface information may be associated with interface movement speed and direction, inclination/tilt relative to ground or north/south pole, interface angular motion, and/or the like. The interface sensor unit 214 may transmit the interface information to the transceiver 208, which in turn may transmit the interface information to the vehicle 102 when the interface 110 may be communicatively coupled with the vehicle 102 and/or when the vehicle 102 enables the interface 110 to cause and/or control the vehicle movement.

The processor 210 may be disposed in communication with one or more memory devices disposed in communication with the respective computing systems (e.g., the memory 212 and/or one or more external databases not shown in FIG. 2). The processor 210 may utilize the memory 212 to store programs in code and/or to store data for performing aspects in accordance with the disclosure. The memory 212 may be a non-transitory computer-readable storage medium or memory storing a program code that may enable the processor 210 to perform operations in accordance with the present disclosure. The memory 212 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.). In some aspects, the processor 210 may be configured to control interface sensor unit operation, and the interface sensor unit 214 may enable transmission of the interface information and the command signals described above to the vehicle 102 based on instructions received from the processor 210.

The vehicle 102 may include a plurality of units including, but not limited to, an automotive computer 216, a Vehicle Control Unit (VCU) 218, and an interface management system 220 (or system 220). The VCU 218 may include a plurality of Electronic Control Units (ECUs) 222 disposed in communication with the automotive computer 216.

In some aspects, the user device 202 may be configured to connect with the automotive computer 216 and/or the system 220 via the network 206, which may communicate via one or more wireless connection(s), and/or may connect with the vehicle 102 directly by using near field communication (NFC) protocols, Bluetooth® protocols, Wi-Fi, Ultra-Wide Band (UWB), and other possible data connection and sharing techniques.

The automotive computer 216 and/or the system 220 may be installed anywhere in the vehicle 102, in accordance with the disclosure. Further, the automotive computer 216 may operate as a functional part of the system 220. The automotive computer 216 may be or include an electronic vehicle controller, having one or more processor(s) 224 and a memory 226. Moreover, the system 220 may be separate from the automotive computer 216 (as shown in FIG. 2) or may be integrated as part of the automotive computer 216.

The processor(s) 224 may be disposed in communication with one or more memory devices disposed in communication with the respective computing systems (e.g., the memory 226 and/or one or more external databases not shown in FIG. 2). The processor(s) 224 may utilize the memory 226 to store programs in code and/or to store data for performing aspects in accordance with the disclosure. The memory 226 may be a non-transitory computer-readable storage medium or memory storing an interface management program code. The memory 226 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

In accordance with some aspects, the VCU 218 may share a power bus with the automotive computer 216 and may be configured and/or programmed to coordinate the data between vehicle systems, connected servers (e.g., the server 204), and other vehicles (not shown in FIG. 2) operating as part of a vehicle fleet. The VCU 218 may include or communicate with any combination of the ECUs 222, such as, for example, a Body Control Module (BCM) 228, an Engine Control Module (ECM) 230, a Transmission Control Module (TCM) 232, a telematics control unit (TCU) 234, a Driver Assistances Technologies (DAT) controller 236, etc. The VCU 218 may further include and/or communicate with a Vehicle Perception System (VPS) 238, having connectivity with and/or control of one or more vehicle sensory system(s) 240. The vehicle sensory system 240 may include one or more vehicle sensors including, but not limited to, a Radio Detection and Ranging (RADAR or "radar") sensor configured for detection and localization of objects inside and outside the vehicle 102 using radio waves, sitting area buckle sensors, sitting area sensors, a Light Detecting and Ranging ("lidar") sensor, door sensors, proximity sensors, temperature sensors, wheel sensors, one or more ambient weather or temperature sensors, vehicle interior and exterior cameras, steering wheel sensors, a vehicle accelerometer, a vehicle gyroscope, a vehicle magnetometer, etc.

In some aspects, the VCU 218 may control vehicle operational aspects and implement one or more instruction sets received from the server 204, from one or more instruction sets stored in the memory 226, including instructions operational as part of the system 220.

The TCU 234 may be configured and/or programmed to provide vehicle connectivity to wireless computing systems onboard and off board the vehicle 102 and may include a Navigation (NAV) receiver 242 for receiving and processing a GPS signal, a BLE® Module (BLEM) 244, a Wi-Fi transceiver, an ultra-wideband (UWB) transceiver, and/or other wireless transceivers (not shown in FIG. 2) that may be configurable for wireless communication (including cellular communication) between the vehicle 102 and other systems (e.g., a vehicle key fob, not shown in FIG. 2, the server 204, the user device 202, the interface 110, etc.), computers, and modules. The TCU 234 may be disposed in communication with the ECUs 222 by way of a bus.

The ECUs 222 may control aspects of vehicle operation and communication using inputs from human drivers, inputs from the automotive computer 216, the system 220, and/or via wireless signal inputs/command signals received via the wireless connection(s) from other connected devices, such as the server 204, the user device 202, the interface 110, among others.

The BCM 228 generally includes integration of sensors, vehicle performance indicators, and variable reactors associated with vehicle systems and may include processor-based power distribution circuitry that may control functions associated with the vehicle body such as lights, windows, security, camera(s), audio system(s), speakers, wipers, door locks and access control, various comfort controls, etc. The BCM 228 may also operate as a gateway for bus and network interfaces to interact with remote ECUs (not shown in FIG. 2). In some aspects, the BCM 228 may be configured to cause the vehicle movement and the vehicle steering wheel rotation based on the command signals (or the user inputs) obtained from the interface 110.

The DAT controller 236 may provide Level-1 through Level-3 automated driving and driver assistance functionality that may include, for example, active parking assistance, vehicle backup assistance, and/or adaptive cruise control, among other features. The DAT controller 236 may also provide aspects of user and environmental inputs usable for user authentication.

In some aspects, the automotive computer 216 may connect with an infotainment system 246 (or a vehicle Human-Machine Interface (HMI)). The infotainment system 246 may include a touchscreen interface portion and may include voice recognition features, biometric identification capabilities that may identify users based on facial recognition, voice recognition, fingerprint identification, or other biological identification means. In other aspects, the infotainment system 246 may be further configured to receive user instructions via the touchscreen interface portion and/or output or display notifications, navigation maps, etc. on the touchscreen interface portion.

The computing system architecture of the automotive computer 216, the VCU 218, and/or the system 220 may omit certain computing modules. It should be readily understood that the computing environment depicted in FIG. 2 is an example of a possible implementation according to the present disclosure, and thus, it should not be considered as limiting or exclusive.

The vehicle 102 may further include a vehicle sensor unit 248 and a plurality of connection ports 250. In some aspects, the vehicle sensor unit 248 may be part of the vehicle sensory system 240. In other aspects, the vehicle sensor unit 248 may be separate from the vehicle sensory system 240. The vehicle sensor unit 248 may include a plurality of sensors including, but not limited to, the vehicle accelerometer, the vehicle gyroscope, the vehicle magnetometer, the interior and exterior vehicle cameras, and/or the like. In some aspects, the vehicle sensor unit 248 may be configured to determine the vehicle information associated with the vehicle movement and/or the plurality of connection ports 250 (e.g., connection status of each connection port with the interface 110). Examples of the vehicle information are already described above in conjunction with FIG. 1.

The interface 110 may be configured to removably attach to the vehicle exterior surface via the plurality of connection ports 250. In some aspects, the plurality of connection ports 250 may be disposed on the vehicle exterior surface, and the interface 110 may be configured to be inserted into a connection port, from the plurality of connection ports 250, to enable electro-mechanical attachment between the interface 110 and the vehicle 102.

In accordance with some aspects, the system 220 may be integrated with and/or executed as part of the ECUs 222. The system 220, regardless of whether it is integrated with the automotive computer 216 or the ECUs 222, or whether it operates as an independent computing system in the vehicle 102, may include a transceiver 252, a processor 254, and a computer-readable memory 256.

The transceiver 252 may be configured to receive information/inputs from one or more external devices or systems, e.g., the user device 202, the server 204, the interface 110, and/or the like, via the network 206. Further, the transceiver 252 may transmit notifications, requests, signals, etc. to the external devices or systems. In addition, the transceiver 252 may be configured to receive information/inputs from vehicle components such as the vehicle sensor unit 248, the plurality of connection ports 250, one or more ECUs 222, and/or the like. Further, the transceiver 252 may transmit signals (e.g., command signals) or notifications to the vehicle components such as the BCM 228, the infotainment system 246, and/or the like.

The processor 254 and the memory 256 may be same as or similar to the processor 224 and the memory 226, respectively. In some aspects, the processor 254 may utilize the memory 256 to store programs in code and/or to store data for performing aspects in accordance with the disclosure. The memory 256 may be a non-transitory computer-readable storage medium or memory storing the interface management program code. In some aspects, the memory 256 may additionally store instructions/information/data/mapping obtained from the server 204, the user device 202, the interface 110, and/or the like.

In operation, when the user 104 desires to cause and/or control the vehicle movement using the interface 110, the user 104 may transmit, via the user device 202 or the infotainment system 246, the request to the transceiver 252 to activate the external interface movement mode associated with the vehicle 102, as described above in conjunction with FIG. 1. The transceiver 252 may then transmit the request to the processor 254. In some aspects, the processor 254 may determine that a trigger event may have occurred when the processor 254 obtains the request from the user 104 via the transceiver 252.

Responsive to obtaining the request, the processor 254 may authenticate the user 104, determine a user location and/or authenticate the interface 110, as described above in conjunction with FIG. 1. Example methods that may be executed by the processor 254 to authenticate the user 104, determine the user location and/or authenticate the interface 110 are described above in conjunction with FIG. 1. In some aspects, the processor 254 may determine that the trigger event may have occurred when the user 104 may be authenticated, the determined user location may be within a predefined distance from the vehicle 102 and/or the interface 110 may be authenticated. Responsive to determining that the trigger event may have occurred, in some aspects, the processor 254 may activate the external interface movement mode associated with the vehicle 102.

In addition, in parallel to receiving the request from the user 104 (via the user device 202 or the infotainment system 246) or responsive to the external interface movement mode being activated and/or the interface 110 being communicatively coupled with the vehicle 102, the transceiver 252 may receive the interface information from the interface sensor unit 214 (via the transceiver 208 and a wired connection or the network 206). In addition, the transceiver 252 may receive the user device information from the user device 202 via the network 206. As described above in conjunction with FIG. 1, the user device information may include information associated with user device movement speed, inclination/tilt relative to ground or north/south pole, user device angular motion, and/or the like.

In some aspects, responsive to determining that the trigger event may have occurred, the processor 254 may obtain the interface information and/or the user device information from the transceiver 252. In addition, responsive to determining that the trigger event may have occurred, the processor 254 may obtain the vehicle information from the vehicle sensor unit 248. As described above, the vehicle information may be associated with the vehicle movement and/or connection status of each connection port from the plurality of connection ports 250 with the interface 110. In some aspects, the processor 254 may determine the interface location and/or orientation relative to the vehicle 102 based on the interface information, the vehicle information and/or the user device information, as described below. Specifically, responsive to obtaining the information described above, the processor 254 may determine whether the interface 110 may be physically/electromechanically attached to a connection port from the plurality of connection ports 250, or the user 104 may be holding the interface 110 in the user's hand.

In a first exemplary aspect, the processor 254 may determine whether the interface 110 may be physically/electromechanically attached to a connection port or the user 104 may be holding the interface 110 in the user's hand (and be outside the vehicle 102) based on the interface information obtained from the interface sensor unit 214. In this case, the processor 254 may analyze the interface information and compare the interface information with historical interface information (that may be pre-stored in the memory 256 or obtained from the server 204) indicative of interface movements when the interface 110 may have been attached to the vehicle 102 and when the interface 110 may have been held in a user's hand. In some aspects, based on comparing the interface information with the historical interface information, the processor 254 may determine whether the interface information corresponds to a vehicle movement or a human movement. For example, when the interface 110 may be held in the user's hand, the interface information may indicate greater change of interface movement direction or orientation and/or sudden increase or decrease of interface speed, as compared to when the interface 110 may be attached to the vehicle 102 (via a connection port).

Figure 3:
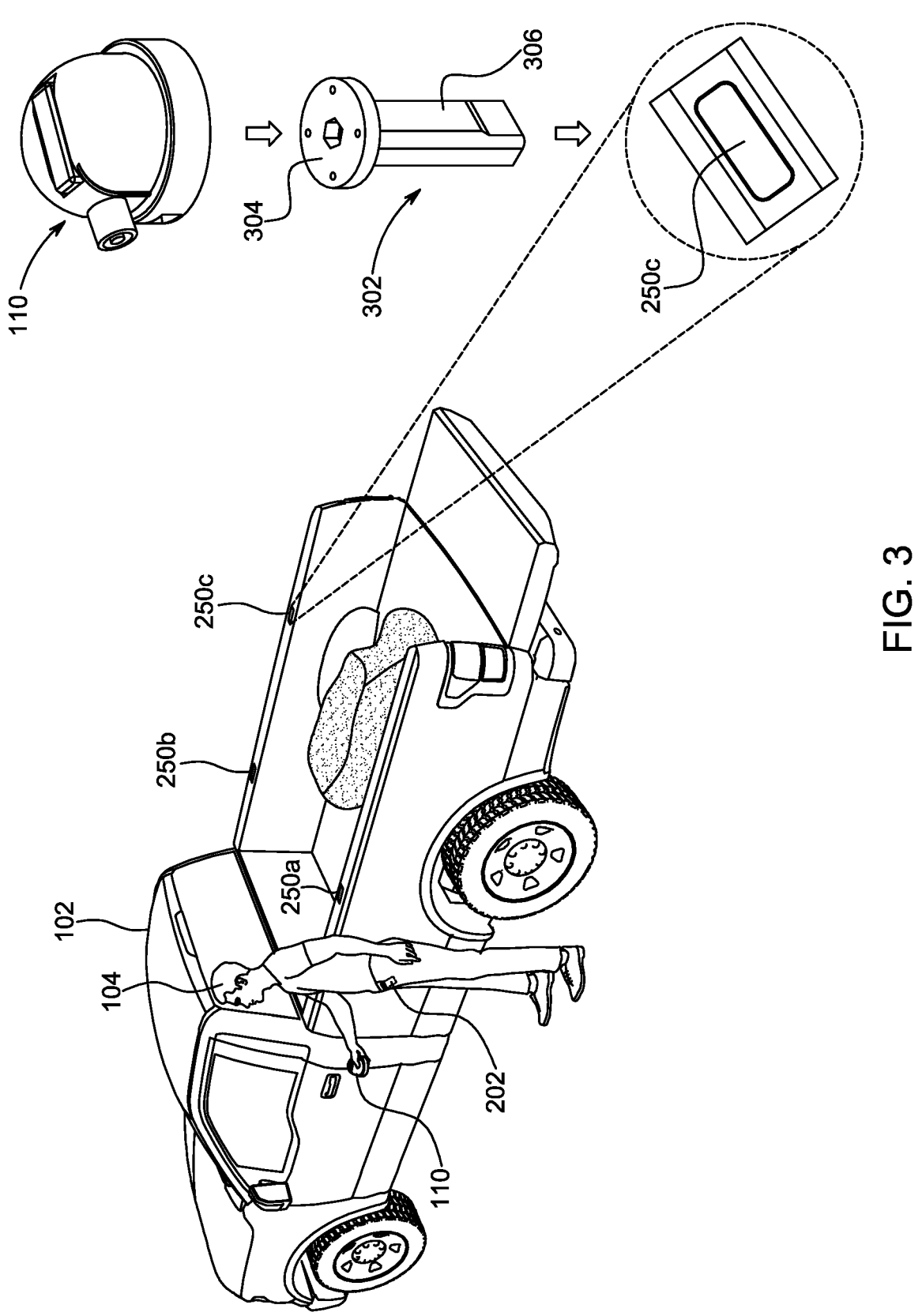
FIG. 3 depicts different external interface locations relative to a vehicle in accordance with the present disclosure.

In some aspects, the processor 254 may analyze the interface information, as described above, in frequency domain to determine whether the interface 110 may be physically attached to the vehicle 102 or user 104 may be holding the interface 110 in the user's hand. In some aspects, the processor 254 may use windowed Fast Fourier Transform, a Wavelet Transform (Haar wavelet), or a band-pass digital filter to analyze the interface information in the frequency domain. In other aspects, the processor 254 may use Artificial Intelligence/Machine Learning (AI/ML), classifiers such as hidden Markov chains, deep learning methods, neural network, etc. to analyze the interface information and determine the interface location and/or orientation (i.e., whether the interface 110 may be physically attached to the vehicle 102 or user 104 may be holding the interface 110 in the user's hand). An example view of the user 104 holding the interface 110 in the user's hand is shown in FIG. 3.

In a second exemplary aspect, the processor 254 may determine whether the interface 110 may be physically attached to a connection port or the user 104 may be holding the interface 110 in the user's hand based on the interface information and the vehicle information associated with the vehicle movement. In this case, the processor 254 may correlate the interface information with the vehicle information associated with the vehicle movement and determine the interface location and/or orientation relative to the vehicle 102 based on the correlation. For example, the processor 254 may compare changes in interface orientation (based on inputs obtained from the interface gyroscope and the interface magnetometer) with changes in vehicle orientation (based on inputs obtained from the vehicle gyroscope and the vehicle magnetometer) and determine that the interface 110 may be disposed in the vehicle 102 (and connected to a connection port) when the changes in the interface orientation matches with the changes in the vehicle orientation. The processor 254 may additionally compare and identify matches between frequency data obtained from the interface accelerometer and the vehicle accelerometer. Responsive to determining that the interface 110 may be disposed in the vehicle 102 based on the comparison/matching described above, the processor 254 may determine the interface orientation relative to the vehicle 102 based on matching between the interface orientation and the vehicle orientation. For example, the processor 254 may determine that interface forward motion direction (e.g., a direction of "push" that the user 104 applies on the interface 110 to cause forward vehicle movement) may be aligned with vehicle forward movement when the interface orientation and the vehicle orientation may be matched. Furthermore, as described above in conjunction with FIG. 1, by using the interface information obtained from the interface accelerometer, the interface gyroscope, and/or the interface magnetometer, the processor 254 may not only determine the interface location relative to the vehicle 102, but may also determine a mounting point or the connection port on the vehicle 102 at which the interface 110 may be attached. This is because an interface rate of change of speed pattern may be a function of a mounting location/point on the vehicle 102, and the processor 254 may compare an axial rate of change of speed pattern associated with the interface 110 obtained from the interface sensor unit with a vehicle axial rate of change of speed pattern obtained from the vehicle sensor unit 248 to determine the interface mounting location/point on the vehicle 102.

Responsive to determining that the interface 110 may be disposed in the vehicle 102 or the interface location may be in the vehicle 102 based on the comparison/matching/correlation described above, the processor 254 may fetch the mapping of different interface locations and/or orientations relative to the vehicle 102 with maximum permissible/allowable vehicle speeds and/or vehicle steering wheel rotation angles and/or maximum permissible/allowable distances the vehicle 102 may travel from the memory 256 or the server 204. The processor 254 may then correlate the determined interface location and/or orientation with the mapping to determine a first maximum permissible/allowable vehicle speed and/or a first maximum permissible vehicle steering wheel rotation angle and/or a first maximum permissible/allowable distance the vehicle 102 may travel based on the determined interface location and/or orientation. For example, the processor 254 may determine that the vehicle 102 may travel at a maximum speed of 5 miles per hour and/or travel a maximum of 500 meters when the interface location may be in the vehicle 102 (e.g., connected to a connection port).

In further aspects, the transceiver 252 may receive command signals from the transceiver 208 when the user 104 may be providing user inputs to the interface 110 to cause and/or control the vehicle movement (e.g., when the external interface movement mode may be activated). The command signals may be associated with the user inputs received on the interface 110 from the user 104. Responsive to the transceiver 252 receiving the command signals from the transceiver 208, the transceiver 252 may transmit the command signals to the processor 254.

Responsive to obtaining the command signals from the transceiver 252, the processor 254 may cause and control, via the BCM 228, the vehicle forward/reverse movement/speed and/or the vehicle steering wheel rotation based on the obtained command signals. In some aspects, the processor 254 may control the vehicle speed and/or the vehicle steering wheel rotation based on the first maximum permissible/allowable vehicle speed and/or the first maximum permissible vehicle steering wheel rotation angle, such that the vehicle speed and/or vehicle steering wheel rotation may not exceed respective maximum permissible values. Further, the processor 254 may enable the vehicle movement such that the vehicle 102 may not travel/move beyond the first maximum permissible/allowable distance. Furthermore, as described above in conjunction with FIG. 1, the processor 254 may control and/or activate vehicle ADAS features and/or vehicle proximity sensors based on the determined interface location relative to the vehicle 102. In addition, based on the determined interface location relative to the vehicle 102, the processor 254 may determine one or more vehicle speakers, vehicle lights or vehicle display screens that may be closest to the determined interface location. The processor 254 may then use the vehicle speakers, the vehicle lights or the vehicle display screens closest to the determined interface location to provide/output one or more notifications associated with an interface operational status, a vehicle movement status, and/or the like, to the user 104. The vehicle 102 may further use remaining vehicle speakers, vehicle lights or vehicle display screens to provide/output similar or different notifications to bystanders who may be located in proximity to the vehicle 102.

In a third exemplary aspect, the processor 254 may determine the interface location and/or orientation, i.e., whether the interface 110 may be physically attached to a connection port or the user 104 may be holding the interface 110 in the user's hand, based on the interface information, the vehicle information associated with the vehicle movement and the user device information. In this case, the processor 254 may correlate the interface information with the vehicle information and correlate the interface information with the user device information to determine whether the interface information matches with the vehicle information or the user device information. In some aspects, when the interface information matches with the vehicle information associated with the vehicle movement, the processor 254 may determine that the interface location may be in the vehicle 102. On the other hand, when the interface information matches with the user device information and does not match with the vehicle information, the processor 254 may determine that the interface location may be outside the vehicle 102. In an exemplary aspect, when the interface information, the vehicle information associated with the vehicle movement and the user information match with each other, the processor 254 may determine that the interface location may be in the vehicle 102 and the user 104 may also be in the vehicle 102. In this case, the processor 254 may determine whether the interface 110 may be connected to a connection port or held in user's hand based on the vehicle information associated with the plurality of connection ports 250, as described in the description later below.

In some aspects, responsive to determining that the interface location may be outside the vehicle 102 based on the correlation of the interface information, the vehicle information and the user device information, the processor 254 may use the mapping described above to determine a second maximum permissible/allowable vehicle speed and/or a second maximum permissible vehicle steering wheel rotation angle and/or a second maximum permissible/allowable distance the vehicle 102 may travel based on the determined interface location of outside the vehicle 102. The processor 254 may then control the vehicle speed, the vehicle steering wheel rotation and/or vehicle travel distance based on the command signals obtained from the transceiver 208/interface 110 and the determined second maximum permissible vehicle speed, the second maximum permissible vehicle steering wheel rotation angle and/or the second maximum permissible distance, as described above.

In further aspects, the processor 254 may also use the interface information and/or the vehicle information associated with the vehicle movement and/or the user device information to determine whether to disable the external interface movement mode or decrease vehicle speed or stop vehicle movement. For example, the processor 254 may disable the external interface movement mode when the processor 254 determines that the vehicle 102 may travelling on a steep terrain (e.g., when a terrain slope angle/gradient may be greater than a predefined threshold), determined based on the vehicle information associated with the vehicle movement. As another example, the processor 254 may decrease vehicle speed when the vehicle 102 may be travelling on a rough terrain, determined based on the vehicle information associated with the vehicle movement. As yet another example, the processor 254 may stop vehicle movement when the user device information indicates a sudden change in orientation (indicating that the user 104 may have fallen or slipped or touched the vehicle 102 or any other obstruction). As yet another example, the processor 254 may decrease the maximum allowable vehicle speed and/or vehicle steering wheel rotation when the processor 254 determines that the user 104 may be holding the interface 110 in the user's hand, determined based on the user device information, the vehicle information, the interface information and/or images obtained from exterior vehicle cameras.

In a fourth exemplary aspect, the processor 254 may determine the interface location and/or orientation relative to the vehicle 102, i.e., whether the interface 110 may be physically attached to a connection port from the plurality of connection ports 250 disposed in the vehicle 102, based on the vehicle information associated with the plurality of connection ports 250. In some aspects, the plurality of connection ports 250 may be disposed at a plurality of locations in the vehicle exterior surface. For example, as shown in FIG. 3, a first connection port 250a may be disposed at a vehicle left side, a second connection port 250b may be disposed at a vehicle right side, and a third connection port 250c may be disposed on a vehicle rear side. The first connection port 250a, the second connection port 250b and the third connection port 250c are collectively referred to as the plurality of connection ports 250 in the present disclosure.

In some aspects, each connection port, from the plurality of connection ports 250, may include one or more pins in a unique orientation/arrangement. The pins may be disposed at a bottom surface or a side surface of each connection port. For example, as shown in view 402 of FIG. 4, a bottom surface of the first connection port 250a may include a first pin 404 (at a center port position) and a second pin 406 that may be disposed towards a left side of the first pin 404. Similarly, as shown in the view 402, a bottom surface of the second connection port 250b may include the first pin 404 and a third pin 408 that may be disposed towards a right side of the first pin 404. Furthermore, as shown in the view 402, a bottom surface of the third connection port 250c may include the first pin 404 and a fourth pin 410 that may be disposed below or towards a rear side of the first pin 404. Pin locations in respective connection ports may be indicative of connection port locations in the vehicle 102 and connection ports' relative orientations with respect to a vehicle front portion.

In an exemplary aspect, the interface 110 may be removably attached to a connection port, from the plurality of connection ports 250, via an elongated connector 302 shown in FIG. 3. The elongated connector 302 may include a top portion 304 and a bottom portion 306. The interface 110 may be electromechanically attached or coupled with the top portion 304, and the bottom portion 306 may be configured to be inserted into the plurality of connection ports 250. Elongated connector shape depicted in FIG. 3 is exemplary in nature and shown only for illustrative purpose. The elongated connector shape depicted in FIG. 3 should not be construed as limiting. The elongated connector 302 may have any other shape, without departing from the present disclosure scope. Further, in some aspects, the elongated connector 302 may be replaced by or may additionally include one or more of clamps, suction cups, magnets, mounting panels, and/or the like.

Figure 4:
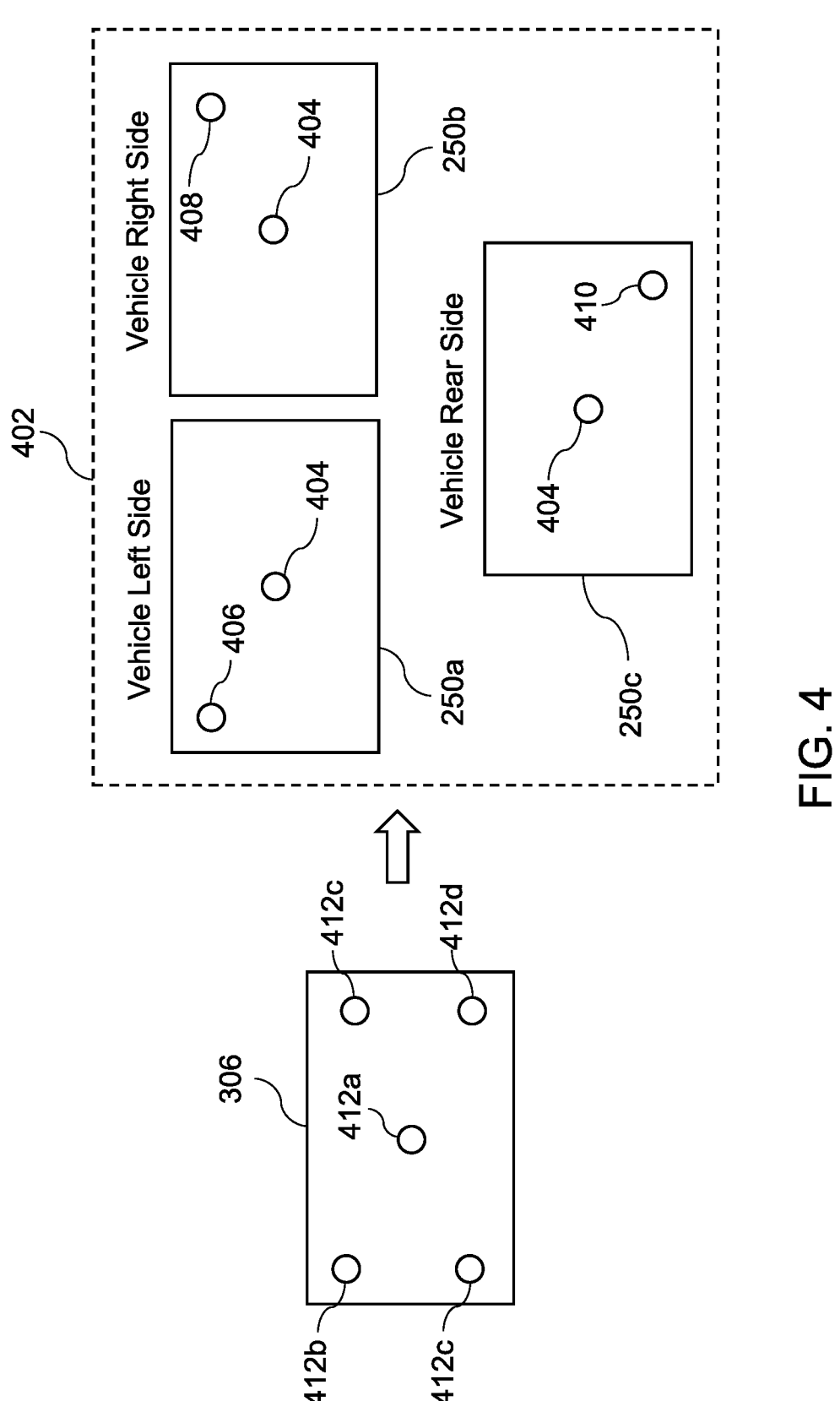
FIG. 4 depicts pin orientations in an external interface and vehicle connection ports in accordance with the present disclosure.

In some aspects, a bottom surface or a side surface of the bottom portion 306 may include one or more connector pins that may be configured to couple with the first, second, third and/or fourth pins 404, 406, 408 and 410 described above. For example, as shown in FIG. 4, the bottom surface of the bottom portion 306 may include a first connector pin 412a, a second connector pin 412b, a third connector pin 412c, a fourth connector pin 412d and a fifth connector pin 412e (collectively referred to as connector pins 412). Location of the connector pins 412 in the bottom portion 306 may correspond to all possible pin location associated with the pins 404, 406, 408 and 410 in the plurality of connection ports 250. When the interface 110 may be inserted into a connection port, from the plurality of connection ports 250, via the elongated connector 302, one or more connector pins 412 may engage with the corresponding pins 404, 406, 408 or 410 in the connection port generating a connection signal. The connection signal generated by the pins 404, 406, 408 or 410 or the connector pins may be used by the processor 254 to determine the interface location in the vehicle 102. Specifically, by using the connection signal, the processor 254 may determine the connection port to which the interface 110 may be attached with, thereby determining the interface location and/or orientation relative to the vehicle 102.

In some aspects, when the connector pins 412 may be disposed at the bottom surface of the bottom portion 306, the connector pins 412 may be disposed at a position (e.g., elevated position) that may prevent water or snow buildup at the bottom surface. In other aspects, when the connector pins 412 may be disposed at the side surface of the bottom portion 306, the connector pins 412 may be spring-loaded so that the connector pins 412 may retract when the elongated connector 302 may be inserted into a connection port and snap out when the connection between the elongated connector 302 and the connection port may be established.

In an exemplary aspect, when the interface 110 may be inserted into the first connection port 250a, the vehicle sensor unit 248 (and/or the processor 254 directly) may receive a first connection signal from the pins 404, 406 when the connector pins 412a, 412b engage with the pins 404, 406. The first connection signal may be indicative of unique orientation of the pins 404, 406 in the first connection port 250a. Responsive to receiving the first connection signal from the pins 404, 406, the vehicle sensor unit 248 may transmit the first connection signal to the processor 254 as part of the vehicle information associated with the plurality of connection ports 250.

The processor 254 may obtain the first connection signal from the vehicle sensor unit 248 or directly from the pins 404, 406 and may determine that the interface location may be in the vehicle 102 and the interface 110 may be attached to the first connection port 250a based on the first connection signal. Responsive to such determination, the processor 254 may use the mapping described above to determine a third maximum permissible/allowable vehicle speed and/or a third maximum permissible vehicle steering wheel rotation angle and/or a third maximum permissible/allowable distance the vehicle 102 may travel based on the determined interface location. The processor 254 may then control the vehicle speed, the vehicle steering wheel rotation and/or vehicle travel distance based on the command signals obtained from the transceiver 208/interface 110 and the determined third maximum permissible vehicle speed, the third maximum permissible vehicle steering wheel rotation angle and/or the third maximum permissible distance as described above.

In some aspects, the pins 404, 406, 408 and 410 associated with the plurality of connection ports 250 may be passive pins, which may mean that the pins 404, 406, 408 or 410 may only be used to determine connection status with the corresponding connector pins 412. In other aspects, the pins 404, 406, 408 and 410 may be active pins, which may mean that the pins 404, 406, 408 and 410 may additionally be used to transmit the command signals from the interface 110 to the vehicle 102 (and/or transmit data/signals from the vehicle 102 to the interface 110).

When the pins 404, 406, 408 and 410 may be passive pins, each connector pin 412 may be set to a digital "high" level (or a level of "1") and the pins 404, 406, 408 and 410 may be connected to ground (or set to a level of "0"). When the elongated connector 302 may be inserted into a connection port, the corresponding connector pins that connect with any two of the pins 404, 406, 408 and 410 may turn to a digital "low" level (as the pins 404, 406, 408 and 410 are connected to ground). In this case, the vehicle sensor unit 248 or the interface sensor unit 214 may poll each connector pin 412 to determine the connector pins that may be turned/pulled to the digital "low" level, thereby determining the connection status between the connection port and the elongated connector 302 and thus the interface location in the vehicle 102.

On the other hand, when the pins 404, 406, 408 and 410 may be active pins, each connector pin 412 and the pin 404 may be first set to the digital "high" level, and the pin 406 may be connected to ground (associated with the first connection port 250a, used as an example). In this case, when the first connection port 250a may be connected with the elongated connector 302, only the connector pin 412b may be turned/pulled to the digital "low" level (since the corresponding pin 406 is connected to ground). The vehicle sensor unit 248 or the interface sensor unit 214 may read the digital low level of the connector pin 412b to determine that the connection pin 412b may be connected with the pin 406. Thereafter, the remaining connector pins may be turned/pulled to the digital low level. In this case, only the connector pin 412a may turn to the digital high level since it may be connected to the pin 404 that is set at the digital "high" level. The vehicle sensor unit 248 or the interface sensor unit 214 may then read the digital high level of the connector pin 412a to determine that the connector pin 412a may be connected with the pin 404. Responsive to determining the connection status of the connector pins 412a, 412b and the pins 404, 406, as described above, the processor 254 may configure these pins to transfer signals (e.g., the command signals associated with the user inputs on the interface 110) between the interface 110 and the vehicle 102.

In alternative aspects, instead of having the pins 404-410, each connection port, from the plurality of connection ports 250, may include a unique near field communication (NFC) tag and the elongated connector 302 may include an NFC reader. In this case, when the elongated connector 302 may be attached to the second connection port 250b (used as an example), the vehicle sensor unit 248 (and/or the processor 254) may receive a second connection signal from the NFC reader (corresponding to the NFC tag). The second connection signal may be indicative of the unique NFC tag associated with the second connection port 250b. Responsive to receiving the second connection signal, the vehicle sensor unit 248 may transmit the second connection signal as part of the vehicle information associated with the plurality of connection ports 250 to the processor 254.

The processor 254 may obtain the second connection signal from the vehicle sensor unit 248 or directly from the NFC reader. Responsive to receiving the second connection signal, the processor 254 may determine that the interface location may be in the vehicle 102 and the interface 110 may be attached to the second connection port 250b based on the second connection signal.

Figure 5:
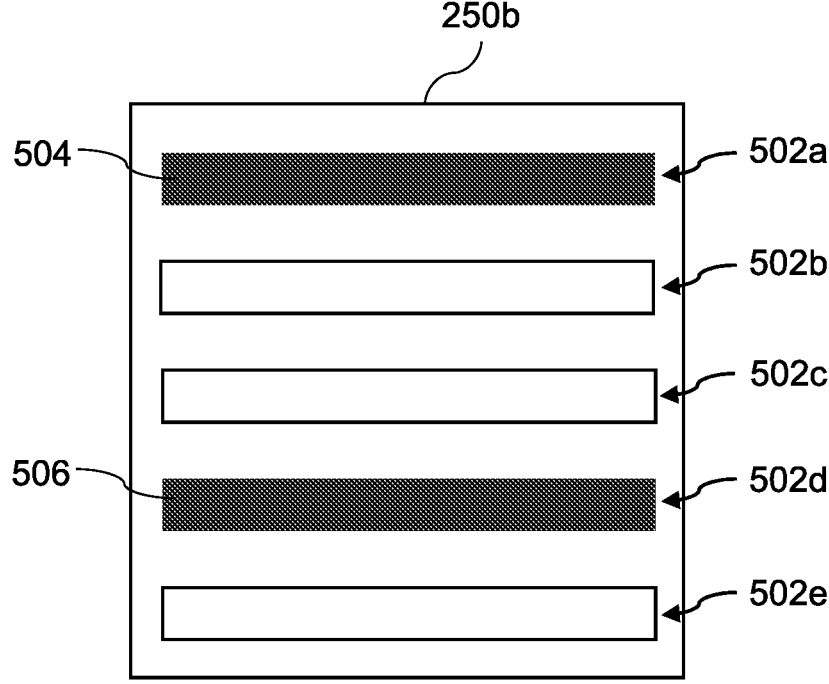
FIG. 5 depicts a conductor pattern in a vehicle connection port in accordance with the present disclosure.

In yet another aspect, each connection port, from the plurality of connection ports 250, may include one or more conductors with a unique pattern (or disposed in a unique arrangement) on a connection port side wall, as shown in FIG. 5. For example, as shown in FIG. 5, the second connection port 250b may include five slots or stripes 502a, 502b, 502c, 502d, 502e on the side wall, and two conductors 504 and 506 may be present in two of the five slots 502a-e. Furthermore, in this aspect, the side wall of the bottom portion 306 may include five stripes of electrodes (e.g., inductive or capacitive electrodes) in a similar arrangement as the slots 502a-e. In this case, when the elongated connector 302 may be inserted into/attached to the second connection port 250b, the vehicle sensor unit 248 (and/or the processor 254) may receive the second connection signal from the conductors 504, 506 that connect with the corresponding electrodes associated with the elongated connector 302. The processor 254 may then use the second connection signal to determine that the interface 110 may be attached to the second connection port 250b, as described above.

Figure 6:
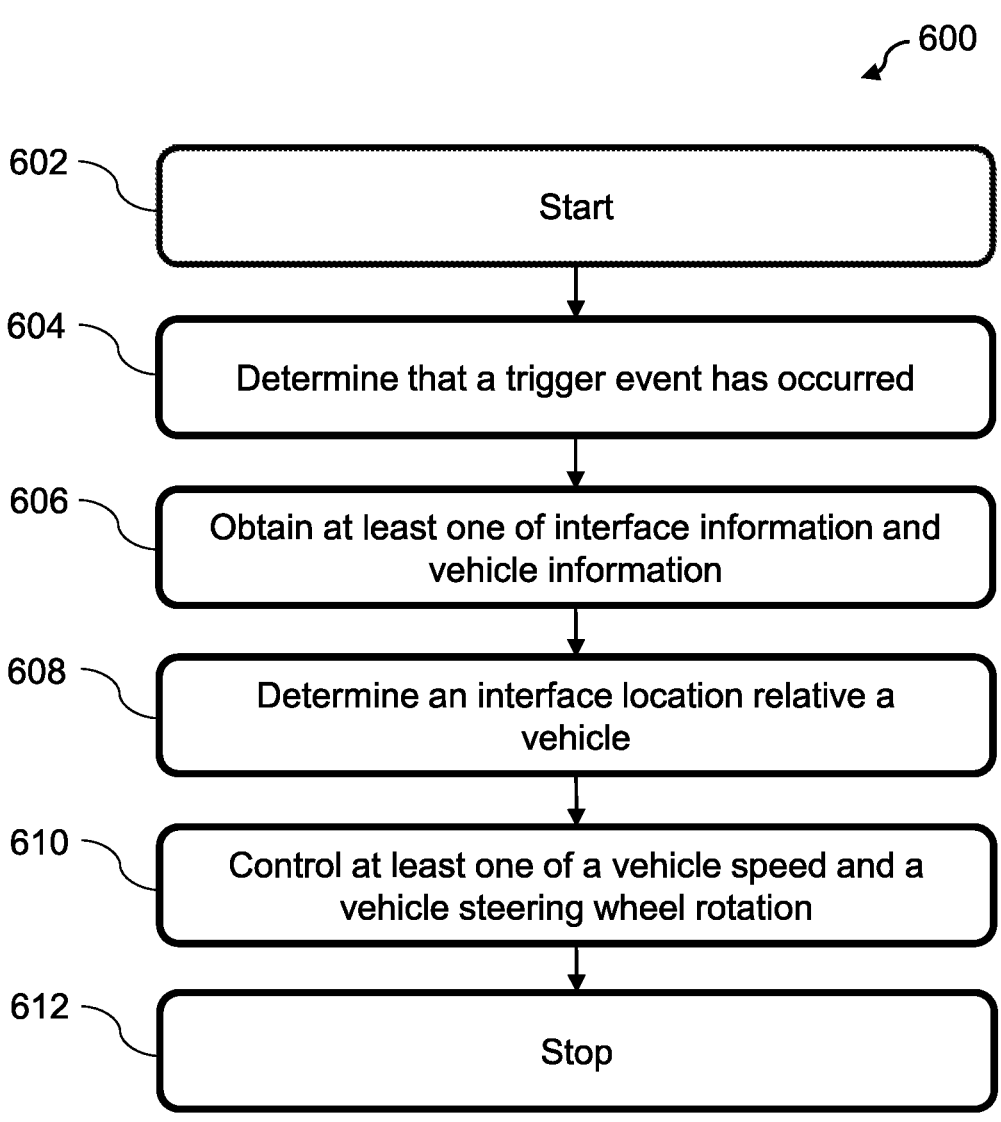
FIG. 6 depicts a flow diagram of a method for causing and controlling vehicle movement in accordance with the present disclosure.

FIG. 6 depicts a flow diagram of an example method 600 for causing and controlling vehicle movement in accordance with the present disclosure. FIG. 6 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 600 starts at step 602. At step 604, the method 600 may include determining, by the processor 254, that the trigger event has occurred. At step 606, the method 600 may include obtaining, by the processor 254, the interface information from the interface sensor unit 215 and/or the vehicle information from the vehicle sensor unit 248 responsive to determining that the trigger event has occurred.

At step 608, the method 600 may include determining, by the processor 254, the interface location relative to the vehicle 102 based on the interface information and/or the vehicle information, as described above in conjunction with FIG. 2. At step 610, the method 600 may include controlling, by the processor 254, the vehicle speed and/or the vehicle steering wheel rotation based on the determined interface location.

The method 600 may end at step 612.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A vehicle comprising:
   a transceiver configured to receive interface information from an interface sensor unit associated with an external interface, wherein the external interface is configured to be removably attached to a plurality of connection ports disposed on the vehicle, and wherein the interface information is associated with an external interface movement;
   a vehicle sensor unit configured to determine vehicle information associated with at least one of a vehicle movement or the plurality of connection ports;
   a processor communicatively coupled with the transceiver and the vehicle sensor unit, wherein the processor is configured to:
   determine that a trigger event has occurred;
   obtain at least one of the interface information or the vehicle information responsive to determining that the trigger event has occurred;
   determine an interface location and interface orientation relative to the vehicle based on the at least one of the interface information or the vehicle information; and
   control at least one of a vehicle speed or a vehicle steering wheel rotation based on the interface location and interface orientation relative to the vehicle,
   wherein the processor is further configured to determine the interface location and interface orientation relative to the vehicle based on comparing a first axial rate of change of a speed pattern of the interface with a second axial rate of change of a speed pattern of the vehicle.

2. The vehicle of claim 1, wherein the processor is further configured to:
   determine a maximum permissible distance the vehicle is configured to move based on the interface location and interface orientation relative to the vehicle; and
   enable the vehicle movement to the maximum permissible distance.

3. The vehicle of claim 1, wherein the processor is further configured to:
   correlate the interface information and the vehicle information associated with the vehicle movement;
   determine, based on correlating the interface information and the vehicle information associated with the vehicle movement, that the interface location is in the vehicle;
   determine at least one of a first maximum permissible vehicle speed or a first maximum permissible vehicle steering wheel rotation angle responsive to determining that the interface location is in the vehicle; and
   control the at least one of the vehicle speed or the vehicle steering wheel rotation based on the first maximum permissible vehicle speed and the first maximum permissible vehicle steering wheel rotation angle.

4. The vehicle of claim 1, wherein the transceiver is further configured to receive user device information from a user device associated with a user, and wherein the processor is further configured to determine the interface location based on the user device information.

5. The vehicle of claim 4, wherein the processor is further configured to:
   correlate the user device information, the interface information and the vehicle information associated with the vehicle movement;
   determine, based on correlating the user device information, the interface information and the vehicle information associated with the vehicle movement, that the interface location is outside the vehicle;
   determine at least one of a second maximum permissible vehicle speed or a second maximum permissible vehicle steering wheel rotation angle responsive to determining that the interface location is outside the vehicle; and
   control the at least one of the vehicle speed or the vehicle steering wheel rotation based on the second maximum permissible vehicle speed and the second maximum permissible vehicle steering wheel rotation angle.

6. The vehicle of claim 4, wherein the processor is further configured to authenticate the user, and wherein the processor determines that the trigger event has occurred when the user is authenticated.

7. The vehicle of claim 4, wherein the processor is further configured to determine a user location, wherein the processor determines that the trigger event has occurred when the user location is within a predefined distance from the vehicle.

8. The vehicle of claim 1, wherein the processor is further configured to authenticate the external interface, and wherein the processor determines that the trigger event has occurred when the external interface is authenticated.

9. The vehicle of claim 1, wherein each connection port of the plurality of connection ports comprises one or more pins disposed in a unique orientation, and wherein the processor is further configured to determine the interface location and the interface orientation relative to a front portion of the vehicle based on an engaging of the interface with a connection port comprising the one or more pins disposed in the unique orientation.

10. The vehicle of claim 9, wherein the vehicle sensor unit is configured to receive a first connection signal from one or more first pins associated with a first connection port, from the plurality of connection ports, when the external interface is attached to the first connection port, wherein the first connection signal is indicative of the unique orientation associated with the one or more first pins, and wherein the vehicle information associated with the plurality of connection ports comprises the first connection signal.

11. The vehicle of claim 10, wherein the processor is further configured to:

obtain the first connection signal from the vehicle sensor unit;

determine that the interface location is in the vehicle and the external interface is attached to the first connection port based on the first connection signal;

determine at least one of a third maximum permissible vehicle speed or a third maximum permissible vehicle steering wheel rotation angle responsive to determining that the interface location is in the vehicle and the external interface is attached to the first connection port; and control the at least one of the vehicle speed or the vehicle steering wheel rotation based on the third maximum permissible vehicle speed and the third maximum permissible vehicle steering wheel rotation angle.

12. The vehicle of claim 9, wherein the processor is further configured to determine a first axial rate of change of a speed pattern of the interface based on determining the interface location and the interface orientation relative to the front portion of the vehicle.

13. The vehicle of claim 1, wherein the processor is further configured to:

determine one or more vehicle speakers, vehicle lights, or vehicle display screens closest to the interface location; and output one or more notifications via the vehicle speakers, the vehicle lights or the vehicle display screens.

14. The vehicle of claim 1, wherein the processor is configured to determine the first axial rate of change of the speed pattern of the interface based on interface information obtained responsive to engaging of the interface with a connection port comprising one or more pins disposed in a unique orientation.

15. The vehicle of claim 1, wherein the processor is configured to determine that the interface is located in the vehicle based on a change in interface orientation matching a change in vehicle orientation.

16. The vehicle of claim 1, wherein the processor is configured to control the at least one of the vehicle speed or the vehicle steering wheel rotation further based on a mapping of a plurality of interface locations and/or interface orientations with vehicle speeds and/or vehicle steering wheel rotation angles.

17. A method to control a vehicle speed and a vehicle steering wheel rotation, the method comprising:

determining, by a processor, that a trigger event has occurred;

obtaining, by the processor, interface information from an interface sensor unit associated with an external interface and vehicle information associated with at least one of a vehicle movement or a plurality of connection ports from a vehicle sensor unit responsive to determining that the trigger event has occurred, wherein the external interface is configured to be removably attached to a plurality of connection ports disposed on a vehicle, and wherein the interface information is associated with an external interface movement;

determining, by the processor, an interface location relative to the vehicle based on the at least one of the interface information or the vehicle information, wherein determining, by the processor, the interface location relative to the vehicle based on the at least one of the interface information or the vehicle information comprises determining the interface location relative to the vehicle based on comparing a first axial rate of change of a speed pattern of the interface with a second axial rate of change of a speed pattern of the vehicle; and controlling, by the processor, at least one of the vehicle speed or the vehicle steering wheel rotation based on the interface location.

18. A vehicle comprising:

a transceiver configured to receive interface information from an interface sensor unit associated with an external interface, wherein the external interface is configured to be removably attached to a plurality of connection ports disposed on the vehicle, and wherein the interface information is associated with an external interface movement;

a vehicle sensor unit configured to determine vehicle information associated with at least one of a vehicle movement or the plurality of connection ports, wherein each connection port of the plurality of connection ports comprises one or more pins disposed in a unique orientation;

a processor communicatively coupled with the transceiver and the vehicle sensor unit, wherein the processor is configured to:

determine that a trigger event has occurred;

obtain at least one of the interface information or the vehicle information responsive to determining that the trigger event has occurred;

determine an interface location and interface orientation relative to the vehicle based on the at least one of the interface information or the vehicle information; and control at least one of a vehicle speed or a vehicle steering wheel rotation based on the interface location and interface orientation relative to the vehicle, wherein the processor is further configured to determine the interface location and the interface orientation relative to a front portion of the vehicle based on an engaging of the interface with a connection port comprising the one or more pins disposed in the unique orientation, wherein the processor is further configured to determine a first axial rate of change of a speed pattern of the interface based on determining the interface location and the interface orientation relative to the front portion of the vehicle.

* * * * *